Feb. 18, 1964    C. A. CLEGG    3,121,564
CLAMPING DEVICE FOR A PLURALITY OF SIMILAR ARTICLES
Filed April 6, 1962    3 Sheets-Sheet 2

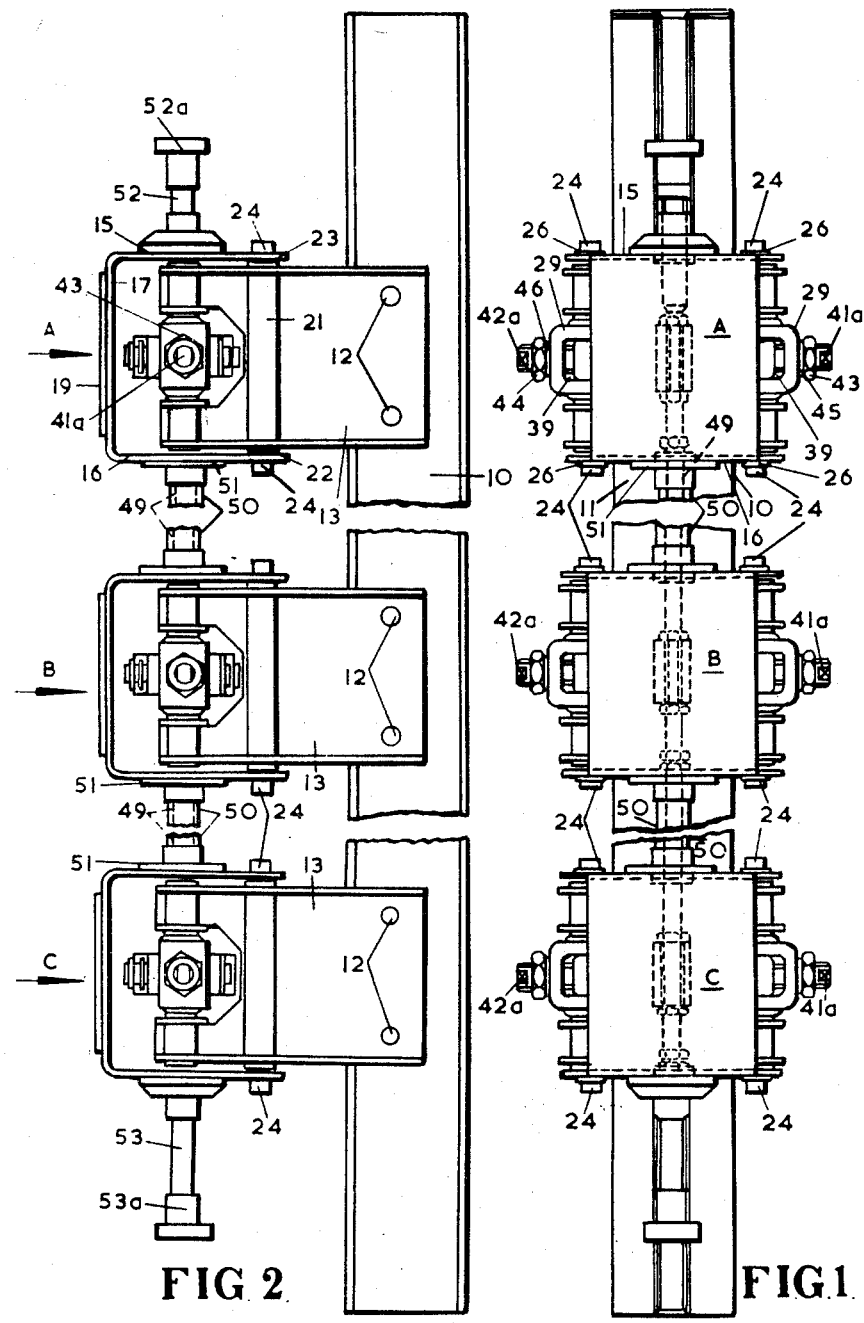

Inventor

By

Attorney

Feb. 18, 1964 — C. A. CLEGG — 3,121,564
CLAMPING DEVICE FOR A PLURALITY OF SIMILAR ARTICLES
Filed April 6, 1962 — 3 Sheets-Sheet 3

Inventor

By

Attorney

United States Patent Office 3,121,564
Patented Feb. 18, 1964

3,121,564
CLAMPING DEVICE FOR A PLURALITY OF SIMILAR ARTICLES
Charles Alan Clegg, Coventry, England, assignor to Clairpol (Machines) Limited, Dartford, England
Filed Apr. 6, 1962, Ser. No. 185,566
Claims priority, application Great Britain Apr. 14, 1961
4 Claims. (Cl. 269—218)

The invention relates to a clamping device for a plurality of similar articles in side-by-side array for an operation thereon, for example, in a machine (e.g., for holding a plurality of unfinished table knife blades for a grinding or polishing operation), and the object of the invention is to provide such a device in which the articles can be inserted prior to the operation, and which can then be transported to, and possibly secured to the machine for holding the articles while the operation is being performed.

According to the invention a clamping device includes a pair of clamping lips supported at longitudinally spaced intervals from toggle-type clamping means, each of the latter having its toggle means connected to a common actuator for simultaneously moving the lips into or out of clamping relationship.

According to a further feature each clamping means includes a body providing a pivotal support for a pair of levers, of the first order, which, at their one corresponding ends, are respectively connected to the clamping lips and which, at their other corresponding ends are respectively pivotally interconnected with the outer ends of a pair of toggle arms, the direction of movement of the central toggle pivot being at right-angles to the plane of movement of the said levers.

Preferably, and according to a still further feature, the bodies of the clamping means are spaced from each other by a distance tube in which is supported a reciprocable rod connected to the central pivots of all the toggle arms for simultaneously operating the clamping lips in either direction.

In such a case the clamping means can be placed in a holder provided with fluid-pressure-operated piston and cylinder means coacting with extending ends of the rod for operating the toggle means. The fluid-pressure-operated piston and cylinder means are operated first to separate the clamping lips for the placing of the articles in position, then to close the clamping lips to grip the articles, and after that has been done the clamping device is removed from the holder and placed in position on the machine by which the operation is to be performed. Afterwards the clamping device is again placed in the holder to facilitate removal of the articles. The piston and cylinder means can be two single-acting piston and cylinder arrangements, or one double-acting piston and cylinder arrangement.

The invention is illustrated by the accompanying drawings, in which:

FIGURE 1 is a side elevation, with parts broken away, of one form of clamping device in accordance with the invention;

FIGURE 2 is a corresponding plan view;

Figure 3:
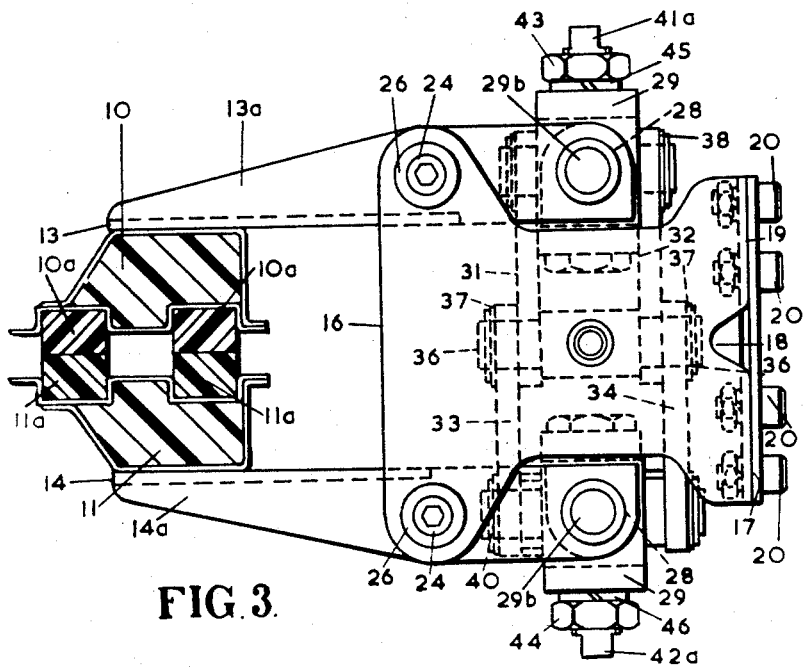
FIGURE 3 is an end view, to a greater scale and partly in section of one of the toggle means shown in FIGURES 1 and 2.

Referring firstly to FIGURES 1 to 3 the clamping device includes upper and lower clamping lips 10, 11 which have rubber gripping strips 10a, 11a held in longitudinal channels of their adjacent faces. In three positions along their lengths the lips 10 and 11 are respectively connected, as by screws or rivets 12, to upper and lower levers 13 and 14 of each of three toggle-type clamping means which are respectively indicated at A, B and C in FIGURES 1 and 2.

Figure 4:
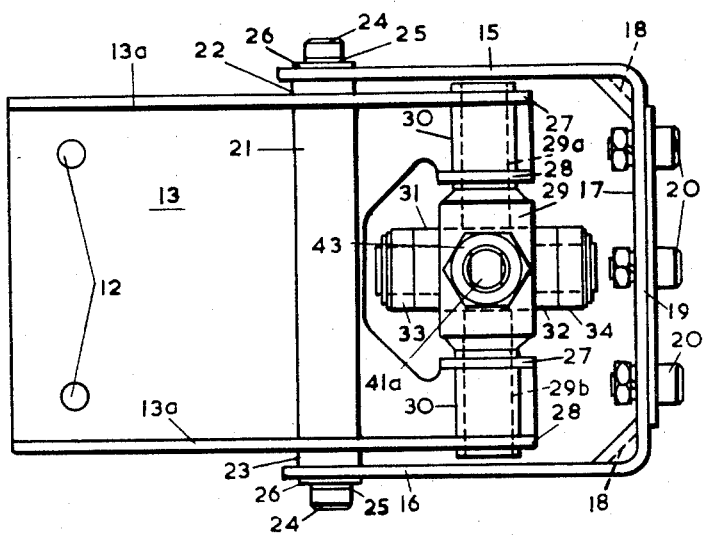
FIGURE 4 is a plan view corresponding with FIGURE 3.
Figures 5, 6:
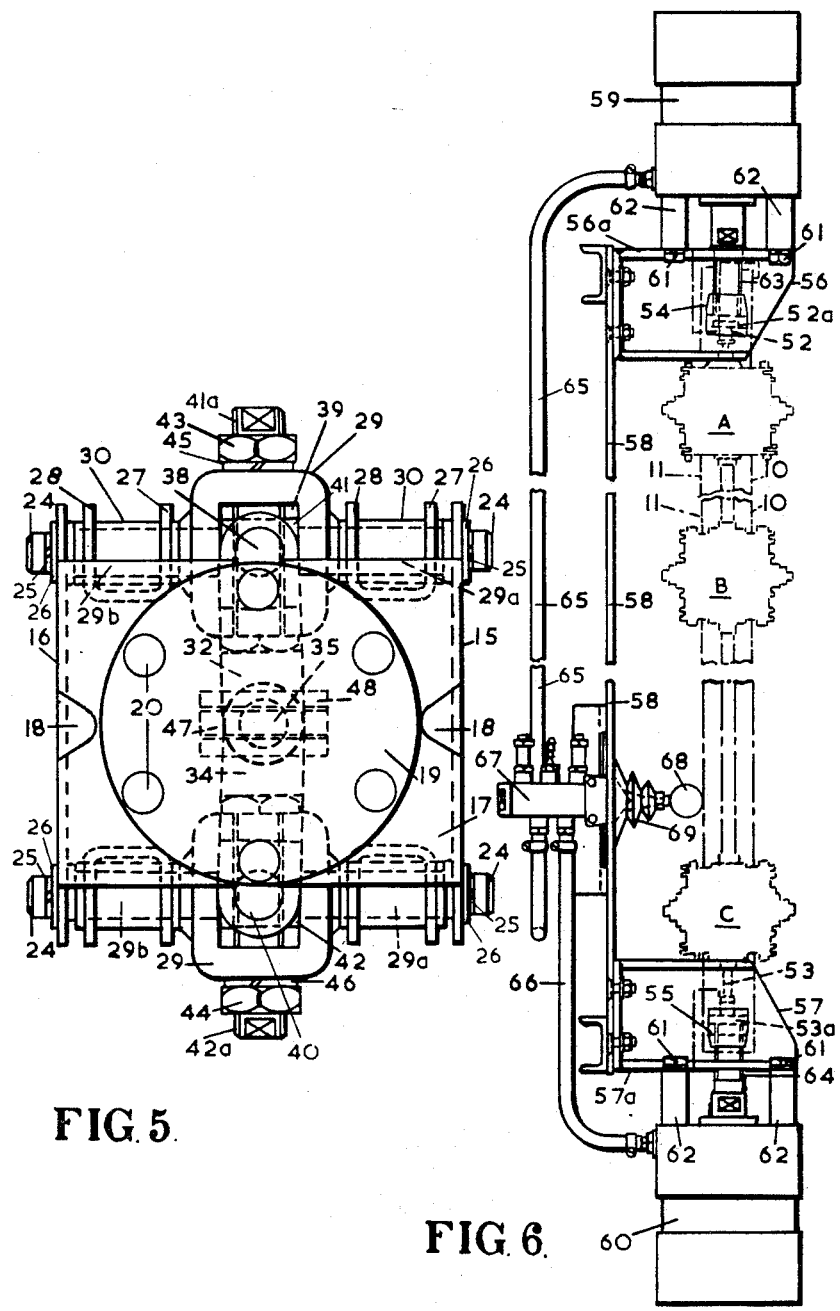
FIGURE 5 is a view of the toggle means looking from the right-hand side of FIGURE 3.
FIGURE 6 is a side elevation showing the clamping device, in the position shown in FIGURE 1, assembled in a holder adapted to be attached to a machine which is to perform an operation on articles held in the clamping device.

As best seen from FIGURES 3, 4, and 5 the levers 13 and 14 have upstanding, stiffening flanges 13a, 14a at each side, these flanges also serving for pivotally attaching the levers from side members 15, 16, united by a yoke portion 17, of a body, which is of rectlinear U-shape in plan, of the associated clamping means. The body is dimpled at the interceptions of its side members and yoke portion as indicated at 18 for stiffening it. Additional stiffening is provided by circular plates 19 held to the exterior of the yoke portion by nuts and bolts indicated at 20.

For pivotally attaching the levers to the side members 15, 16 use is made of respective pivot pins which extend through distance tubes 21, 22, 23, and holes in the stiffening flanges and side members, the ends of the pins being located by socket-headed screws 24 and spring washers 25 bearing on plain washers 26.

At their rear ends the levers are bifurcated, and both limbs of the bifurcation are provided with a pair of upstanding flanges 27, 28. The pairs of flanges 27, 28 of the upper and lower levers are journalled on aligned, cylindrical arms 29a, 29b of respective cross-members 29, distance tubes 30 being arranged between the flanges of each pair, and the central portion of each cross-member is formed as a housing for the adjacent end of a toggle mechanism.

The latter includes a pair of parallel links 31, 32 forming one arm of the toggle, and a pair of parallel links 33, 34 forming the other arm. The respective pairs of toggle links have their common pivotal connection on a member 35, being held in position by socket-headed screws 36 and washers 37. The outer ends of the links 31 and 32 have a similar pivotal connection with a pivot pin 38 which can be located, as hereinafter described, in a parallel-sided aperture 39 of the central housing portion of the upper cross-member 29, while the links 33 and 34 have a similar pivotal connection with a pivot pin 40 which can be located in the corresponding aperture of the lower cross-member 29. The pivot pins 38 and 40 are journalled in respective blocks 41 and 42 having screw-threaded ends 41a, 42a which extend through the cross-members 29, 29 and are provided with nuts 43, 44, and spring washers 45, 46, respectively, for adjustment purposes.

The member 35 is cruciform in plan to provide a pair of internally screw-threaded lateral extensions 47, 48 in which is engaged an externally screw-threaded operating rod 49 (see FIGURES 1 and 2) for simultaneously operating all three clamping means in either direction when it is moved axially. The screw-threads are merely used as a convenient way of axially locating each of the members 35 on the rod 49 in their proper spaced relationship. The latter is preserved by respective, aligned distance tubes 50 through which the rod 49 extends and which have flanged ends 51 attached to the adjacent side members 15, 16 of the bodies of the respective clamping means.

Each end of rod 49 extends axially beyond the outermost clamping means body such that when one of the extending ends is pushed the toggle mechanisms will be operated to bring the clamping lips into firm engagement with the articles to be held between them, and that when the other end is pushed the clamping pressure will be released so as to enable the articles to be removed.

It is preferably arranged for the assembly thus far described to be mounted in a holder such, for example, as shown in FIGURE 6. For this purpose the extending ends of rod 49 are provided with necks 52 and 53 under heads 52a and 53a to be engaged in coacting undercut lodgements 54 and 55 extending through brackets 56 and 57 which are tied together by a member 58 jointly to form the holder. The brackets have respective flanges 56a and 57a to which are secured respective, single-acting, pneumatic piston and cylinder arrangements 59 and 60. The latter are held to the flanges by bolts 61 and distance tubes 62.

The lodgements 54 and 55 are formed on the piston rods 63 and 64 of the arrangements 59 and 60, and the cylinders of the latter communicate through pipes 65 and 66 with a reversing valve shown comprehensively at 67. The latter is operable by a manually-reciprocable control 68 of which the stem is sealed by a pleated sleeve 69 secured to the member 58.

In operation, the clamping device is assembled in the holder, the valve 67 is then operated to separate the lips 10 and 11 so that the articles can be placed between them, and the valve 67 is then operated to move the lips into their clamping positions. The clamping device is then removed from the holder and placed in a machine in which the operation on the articles is to be performed. Afterwards the clamping device is removed from the machine and replaced in the holder, which latter is then operated for releasing the articles.

What I claim as my invention and desire to secure by Letters Patent of the United States is:

1. A clamping device for holding a plurality of similar articles side by side for an operation to be performed thereon, comprising a pair of clamping lips and a plurality of toggle-type clamping means, each said clamping means comprising a pair of levers, said clamping means spaced along said clamping lips, the levers of each pair respectively having one end fast with said clamping lips, a toggle linkage for each clamping means, said toggle linkages having pivot axes at right-angles to said clamping lips, said toggle linkages interconnecting the other ends of said levers, an operating rod operatively connected to said toggle linkages, and means for axially moving said operating rod in either direction so as to move said clamping lips into and out of clamping relationship.

2. A clamping device for holding a plurality of similar articles side by side for an operation to be performed thereon, comprising a pair of clamping lips and a plurality of toggle-type clamping means, each toggle-type clamping means comprising a body having parallel side members united at one end by a yoke member, each said clamping means further comprising a pair of levers arranged between and pivoted from said side members of said body, said clamping means bodies spaced along said clamping lips, the levers of each pair respectively having one end fast with said clamping lips, a toggle linkage for each clamping means, said toggle linkages having pivot axes at right-angles to said clamping lips, said toggle linkages interconnecting the other ends of said levers, an operating rod operatively connected to said toggle linkages, and means for axially moving said operating rod in either direction so as to move said clamping lips into and out of clamping relationship.

3. A clamping device for holding a plurality of similar articles side by side for an operation to be performed thereon, comprising a pair of clamping lips and a plurality of toggle-type clamping means, each toggle-type clamping means comprising a body having parallel side members united at one end by a yoke member, each said clamping means further comprising a pair of levers arranged between and pivoted from said side members of said body, said clamping means bodies spaced along said clamping lips, the levers of each pair respectively having one end fast with said clamping lips, a toggle linkage for each clamping means, each said toggle linkage comprising a pair of lever means arranged end to end, a cruciform member, the adjacent ends of said pair of lever means pivoted from two opposite arms of said cruciform member, the outer ends of said pair of lever means respectively pivoted from the other ends of said levers, the axes of the pivots interconnecting said lever means to said cruciform member and to said other ends of said levers directed at right-angles to said clamping lips, an operating rod aligned with and interconnecting the other arms of said cruciform members of all said toggle linkages, and means for axially moving said operating rod in either direction so as to move said clamping lips into and out of clamping relationship.

4. A clamping device for holding a plurality of similar articles side by side for an operation to be performed thereon, comprising a pair of clamping lips and a plurality of toggle-type clamping means, each toggle-type clamping means comprising a body having parallel side members united at one end by a yoke member, each said clamping means further comprising a pair of levers arranged between and pivoted from said side members of said body, the levers of each pair respectively having one end fast with said clamping lips, a toggle linkage for each clamping means, each of said toggle linkage comprising a pair of lever means arranged end to end, a cruciform member, the adjacent ends of said pair of lever means pivoted from two opposite arms of said cruciform member, the outer ends of said pair of lever means respectively pivoted from the other ends of said levers, the axes of the pivots interconnecting said lever means to said cruciform member and to said other ends of said levers directed at right-angles to said clamping lips, an operating rod aligned with and interconnecting the other arms of said cruciform members of all said toggle linkages, aligned tubular members interconnecting said clamping means bodies and holding them in spaced relationship along said clamping lips, said operating rod extending through said tubular members, and means for axially moving said operating rod in either direction so as to move said clamping lips into and out of clamping relationship.

References Cited in the file of this patent
UNITED STATES PATENTS

| | | |
|---|---|---|
| 1,822,501 | Onsrud | Sept. 8, 1931 |
| 2,617,457 | Warwick | Nov. 11, 1952 |